United States Patent [19]

Martin

[11] 4,069,485

[45] Jan. 17, 1978

[54] BIDIRECTIONAL INK JET PRINTER WITH MOVING RECORD RECEIVER

[75] Inventor: Van Clifton Martin, Boulder, Colo.

[73] Assignee: International Business Machines Corporation, Armonk, N.Y.

[21] Appl. No.: 744,223

[22] Filed: Nov. 22, 1976

[51] Int. Cl.[2] .......................... G01D 15/18; B41J 1/00

[52] U.S. Cl. ....................................... 346/75; 197/1 R

[58] Field of Search .......................... 346/75; 197/1 R

[56] References Cited

U.S. PATENT DOCUMENTS

| | | | |
|---|---|---|---|
| 1,736,219 | 11/1929 | Ranger | 346/75 X |
| 3,752,288 | 8/1973 | Detig et al. | 197/1 R |
| 3,764,994 | 10/1973 | Brooks et al. | 197/1 R X |
| 3,970,183 | 7/1976 | Robinson et al. | 197/1 R |
| 4,009,332 | 2/1977 | Hook | 346/75 X |

*Primary Examiner*—George H. Miller, Jr.
*Attorney, Agent, or Firm*—John H. Holcombe

[57] ABSTRACT

An ink jet printer which includes data storage and which prints with multiple jets in an interlace fashion on paper supported on a rotating drum is provided with a bidirectional ink jet transport for moving axially along the drum. A gating arrangement is provided for gating the stored data to printing controls for the multiple jets in a first order upon the transport moving in a first axial direction and for gating the stored data to the printing controls in a second order upon the transport moving in the opposite axial direction.

12 Claims, 10 Drawing Figures

BIDIRECTIONAL INK JET PRINTER WITH MOVING RECORD RECEIVER

CROSS REFERENCE TO RELATED APPLICATION

Copending U.S. patent application Ser. No. 700,632, Fox et al., "Ink Jet Copier", filed June 28, 1976, and assigned in common with the present Application, describes an ink jet printer to which the present invention may be applied.

BACKGROUND OF THE INVENTION

1. Field of the Invention

The invention relates to ink jet printing, and, more particularly, to multiple jet ink jet printing.

2. Description of the Prior Art

Ink jet printers having an insufficient number of ink jets to span the entire width of a document to be printed, may recirculate the document on a rotary drum, while moving the ink jets axially of the drum. After the document has been printed, the document is unloaded, a new document loaded, and the ink jets are moved back to the initial position.

The slow, precision mechanism for moving the ink jets while printing is unsuitable for moving the ink jets back to the initial position at high speed. Hence, a special high-speed flyback mechanism must be provided, and means must be provided for precisely positioning the ink jets at the initial position.

In such precision printing systems, the drum rotation and the data transmission capabilities are unidirectional. Thus, the drum direction and ink jet print direction cannot be reversed to print alternate documents. Drums are unidirectional primarily because the document loading and unloading mechanisms are usable only while the drum is rotating in a single direction, and because the time required to stop a drum and reverse its direction would be so high as to be impractical.

An early patent, U.S. Pat. No. 1,736,219, Ranger, issued Nov. 19, 1929, "Cross Screen Picture Receiving System" discloses printing a single document by scanning a single hot air print element back and forth while the document is rotated by a drum. It requires, however, a data source or scanner which also moves back and forth and transmits the data in the same fashion as used. Such a system is extremely slow in that each point is printed twice and is not precise. Nothing is proposed for multiple print elements.

U.S. Pat. No. 3,764,994, Brooks et al, issued Oct. 9, 1973, "Serial Printer with Bi-Directional Drive Control" teaches a printer having a moving print mechanism which scans first in one direction across a stationary document to print a line of characters, steps the document to the next line, and scans in the reverse direction to print the next line. The stepping function is not sufficiently precise to allow high quality printing of images, and the bidirectional arrangement cannot be used with a continuously rotating precision drum.

It is therefore an object of the present invention to provide apparatus for producing high quality printing with multiple jet ink jets without moving the ink jets back across a document to the same initial position after printing.

SUMMARY OF THE INVENTION

In accordance with the present invention, a multiple jet ink jet printer which scans a document to be printed that is mounted on a rotating drum by relatively moving the jets axially along the drum to interlace the paths traced by the jets, is provided with means for bidirectionally scanning the document to be printed. The direction of scan for a document to be printed is indicated by an indicating means. The indication is employed to operate gating means to gate print information to printing control means for the multiple jets in a first order upon the indication of a first axial scan direction, and to gate the print information in a second order upon the indication of the opposite axial scan direction.

DESCRIPTION OF THE PREFERRED EMBODIMENT

Figure 1:
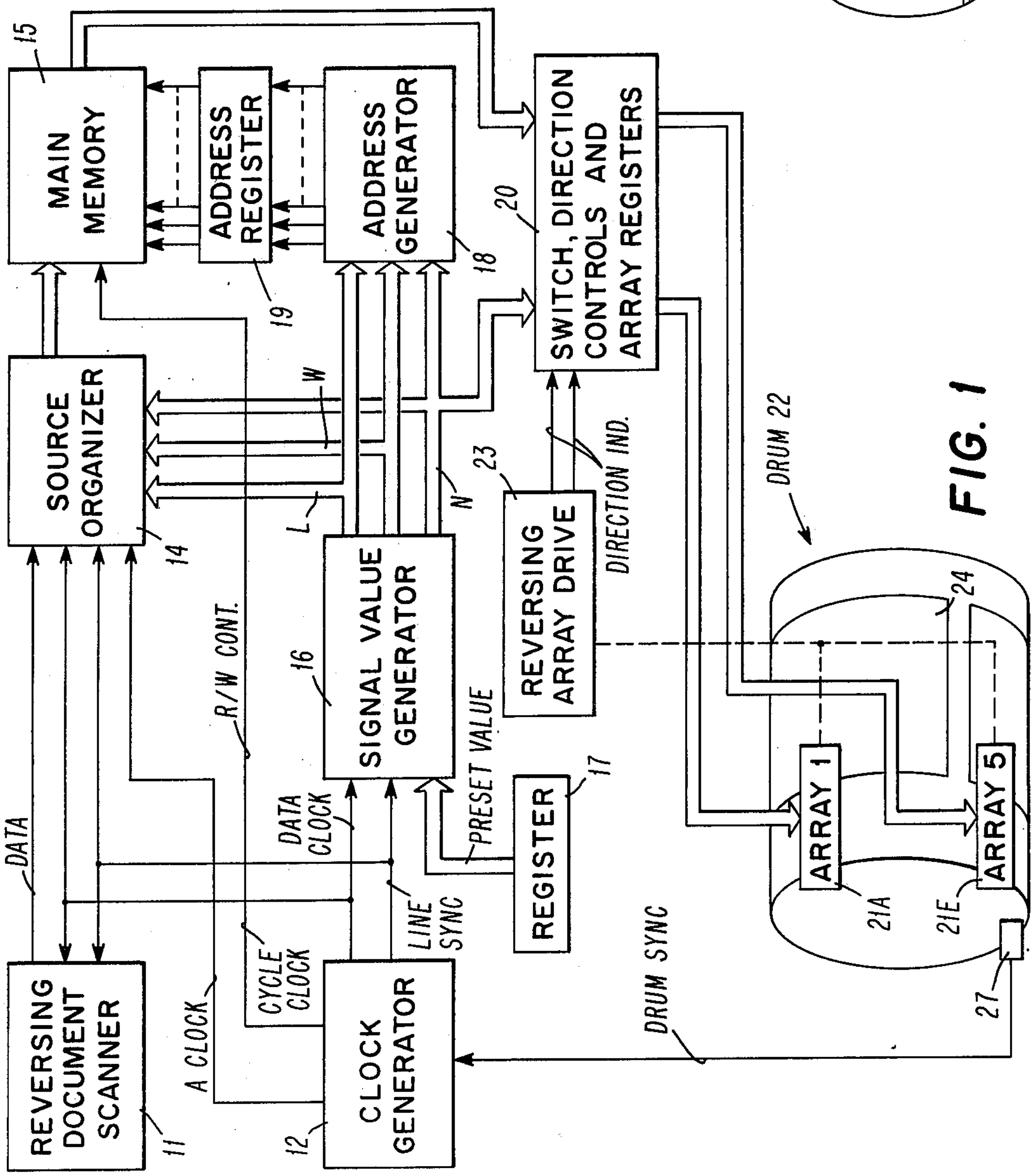
FIG. 1 is a block diagram of an ink jet printing system constructed in accordance with the present invention.
Figure 8:
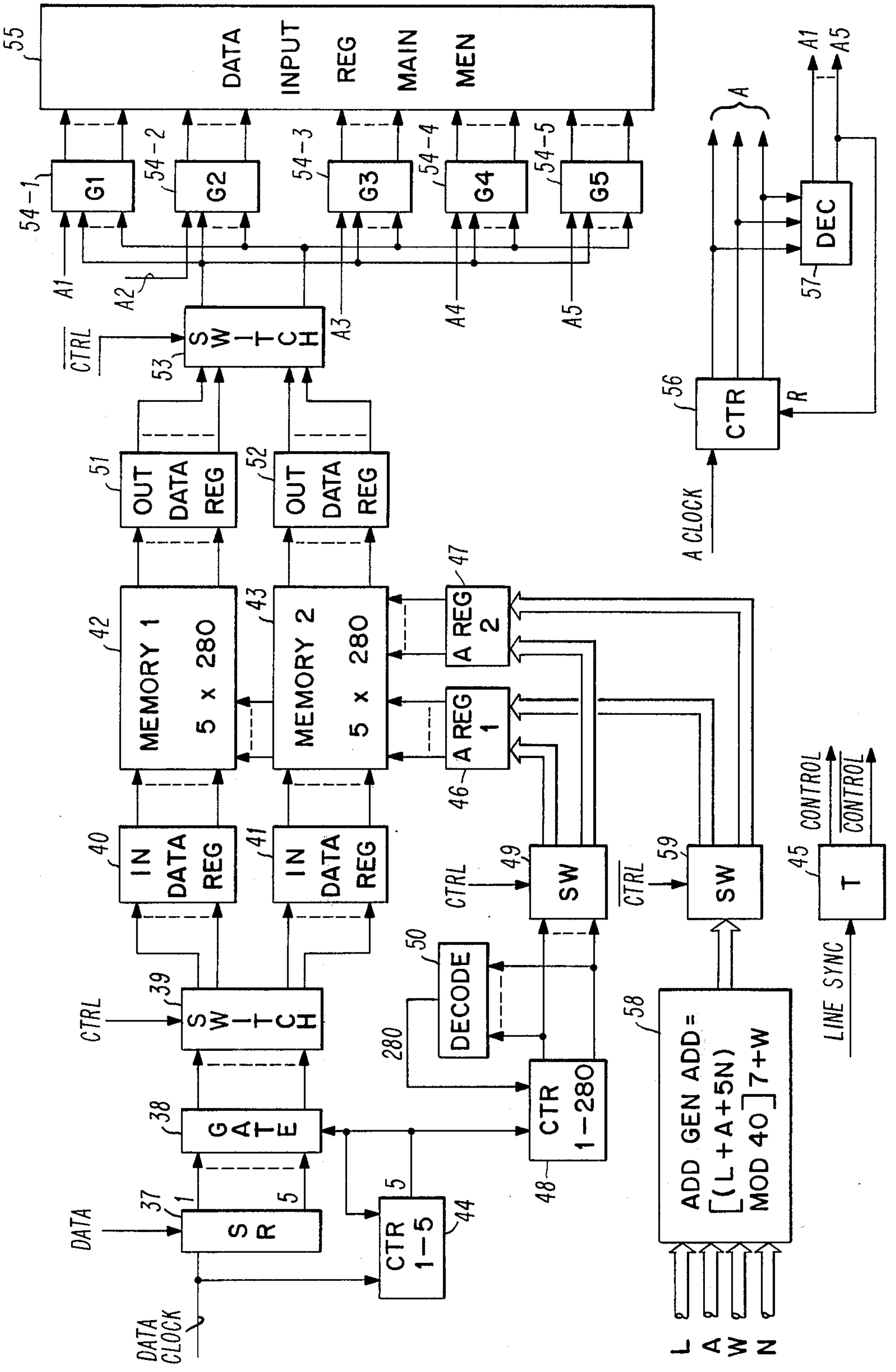
FIG. 8 is a detailed block diagram of the Source Organizer illustrated in FIG. 1.

FIG. 1 is a block diagram of an ink jet printing system and includes a reversing document scanner 11 arranged to scan a document which is to be copied, first in one direction, and then in the opposite direction. The document scanner 11 may take any suitable form, preferably arranged to scan serial horizontal lines in succession down the length of the document and provide a serial data stream indicative of the image content of the document on a line-by-line basis. The document scanner 11 is controlled by a line synchronizing clock signal generator 12. The line synchronizing signals cause the document scanner to scan one line at a time upon the occurrence of each of the line synchronizing signals. The data clocking signals provide the bit information. The line synchronizing signals and the data clocking signals are identical for both directions of scan of the reversing document scanner. The reversible document scanner scans first in one direction, coming to a stop, and then makes a second scan in the reverse direction, rather than being reset to make the second scan in the same direction as the first scan. Typically, reversing document scanner 11 will provide 40 lines in 257 mils of document length and the data clock will provide 1400 bits in each of the scanned lines. The values set forth are typical for an ink jet copier if constructed in accordance with the invention described herein. These values may be varied over a wide range, depending upon the resolution required in the copy. The non-coded video data from the reversing document scanner 11 is applied to the data input of a source organizer 14. Details of source organizer 14 are illustrated in FIG. 8 and are described in detail in the copending Fox et al patent application, referenced above. As shown in FIG. 8, the source organizer 14 is provided internally with two memory areas 42 and 43. The successive lines of data from reversing scanner 11 are stored in these two memory locations according to a predetermined scheme independent of the direction of scan of reversing scanner 11. The data on the first line, for example, is stored in the first storage location 42. After this data has been received, the data from the second line is stored in the second storage location 43. While the second line is being stored in the second locaton, the data previously stored in the first location is collectively inserted into the main memory 15 of FIG. 1. The source organizer 14 utilizes four control signals provided by clock generator 12 and three additional signals provided by a signal value generator circuit 16. The clock generator and the signal value generator circuit are both illustrated and described in the referenced Fox et al copending application. In addition to the same data clock and line sync signals as applied to reversing document scanner 11, source organizer 14 receives a cycle clock signal and an array clock signal A from the clock generator circuit 12. The three signals received from the signal value generator circuit 16 are a line value labeled "L", a nozzle value labeled "N", and a word value labeled "W". The signal value generator 16 receives the line sync and data clock signals from clock generator 12 and a preset value signal stored in a register 17. The contents of register 17 represent misalignment of the paper or media 24 with respect to a mounting drum or media support 22 on which, and with respect to which, the image is generated. If no misalignment is present, the value stored in register 17 is zero.

The data stored in source organizer 14 is presented to the main memory 15 based on the input signals from clock generator 12 and signal value generator 16. The actual storage locations selected are determined by an address generator 18 which responds to the "L", "N", and "W" signals from signal value generator 16 by generating the addresses within which the data presented by source organizer 14 will be located. Address generator 18 provides an output which is inserted is an address register 19 which actually controls the locations within main memory 15 where the data from source organizer 14 is inserted. Address generator 18 is shown in detail and is described in detail in the referenced Fox et al copending application.

The image data stored in main memory 15 is supplied one word at a time via circuitry 20 to ink jet arrays 21A through 21E. Circuitry 20 includes a switch, direction control circuitry, and array registers. The circuitry 20 is illustrated in detail in FIG. 9 and is described hereinafter in connection with FIG. 9. The stored signals from main memory 15 control the printing control means for the nozzles associated with each of the five arrays, thus controlling the deposition of ink on the media mounted on the drum 22. The arrays are reversibly driven by an array drive 23 in an axial direction along the drum periphery. Thus, each nozzle describes a spiral about the drum, the control means selectively modulating the ink deposited by the nozzle as the nozzle array is driven axially and the drum is driven in a rotary direction, which causes the image to appear on the media 24 mounted on the drum 22. The arrays 21A through 21E are seen in greater detail in FIGS. 2 and 3 and will be described hereinafter.

A read/write control signal from clock 12 is applied to main memory 15, and as each memory address is generated by address generator 18, as described above, a read cycle is executed causing the contents of the memory location to be applied to the arrays as described above. The read cycle is followed by a write cycle in which the new image information is stored in the address indicated by address generator 18. This information will be supplied to the nozzle arrays the next time this address in main memory 15 is accessed. A drum sync signal is applied to clock generator 12 and causes the line sync signal issued therefrom to be synchronized to the drum sync signal. Thus, the data from reversing document scanner 11 cannot fall behind or get ahead of printing which occurred on the media 24. This prevents underruns and overruns of data in memory 15, thus reducing the required amount of storage. The array drive 23 supplies direction indication signals to the circuitry 20 to control the gating of the data from main memory 15 to the ink jet arrays.

Figure 3:
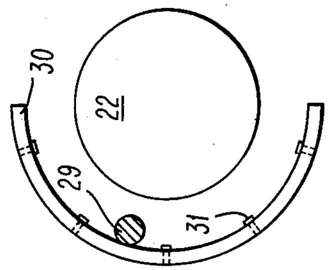
FIGS. 2 and 3 are schematic diagrams of the nozzle array and drum illustrated in FIG. 1.
Figure 2:
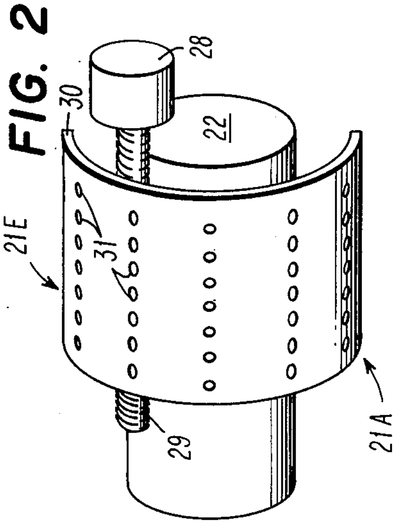

FIGS. 2 and 3 illustrate the drum, the array mountings, and the array drive. The drum 22 is supported for rotation by conventional structures which are not illustrated in FIGS. 2 or 3. Adjacent to the periphery of the drum is an array drive motor 28 which drives a lead screw 29. The array support 30 is mounted on the lead screw 29 and travels in an axial direction along the drum surface on the screw 29. Forty ink jet nozzles 31 illustrated schematically are supported on the array support 30. They are arranged in five linear groups of eight each. The details of the ink jet nozzles and the associated ink jet printer structures have been intentionally deleted in as much as conventional ink jet nozzles and ink jet printer mechanisms may be utilized with the invention.

As described in the Fox et al copending application referenced above, the specific nozzle arrangement described above is exemplary only. A large number of nozzle arrangements may be selected when the rules set forth in the copending application are followed. Briefly, the nozzles in each of the arrays may be widely spaced since adjacent nozzles are not required to cover adjacent segments of the circumference of the drum. Each of the circumferential lines around the drum is divided into equal length segments and the number of segments selected equals the total number of nozzles and the lines are spaced one resolution element apart. Thus, the nozzles may be spaced larger than the center to center spacing of the drop or the lines on the paper.

Figure 4:
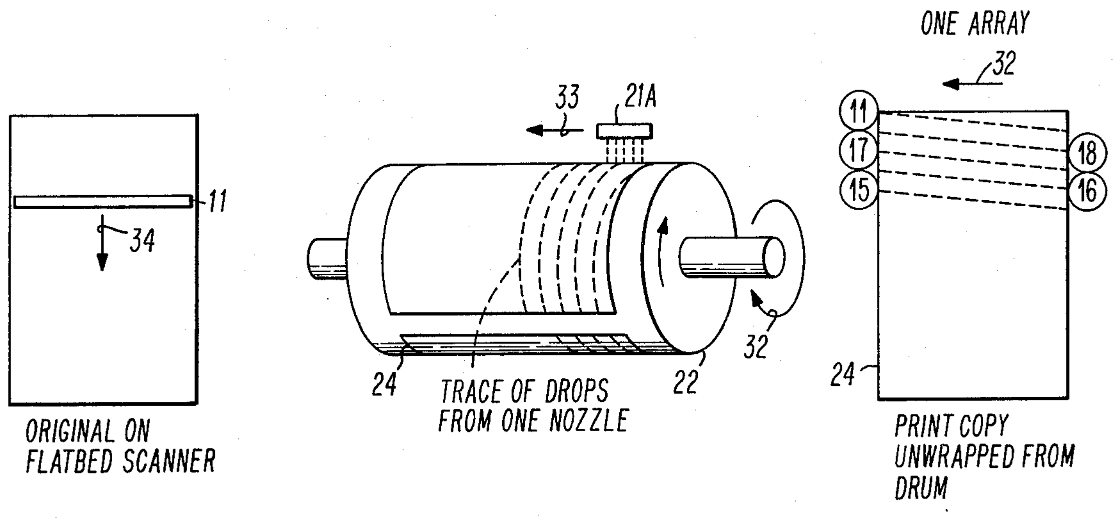
FIGS. 4 and 5 are schematic diagrams of the drum, print copy, and data source illustrated in FIG. 1, scanning in opposite directions.
Figure 5:
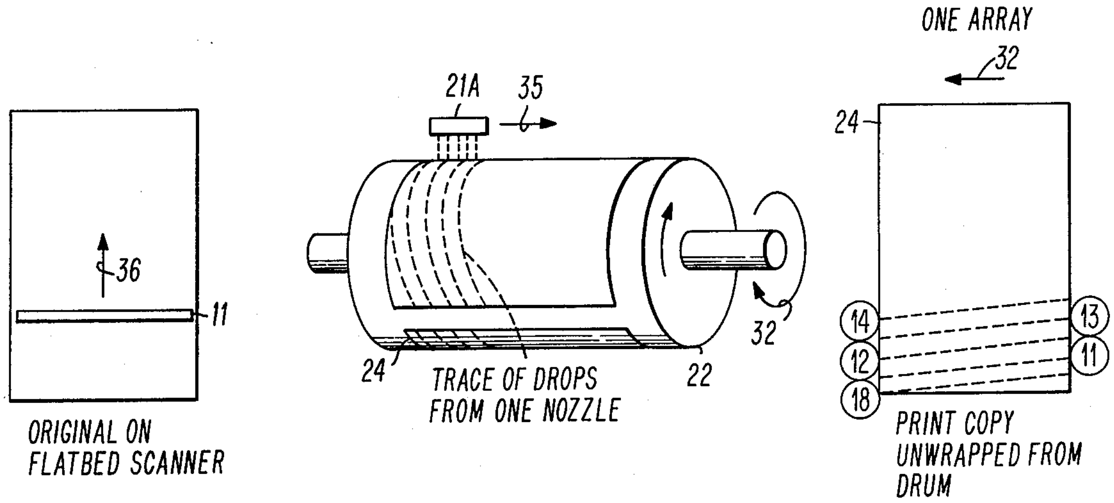

Referring to FIGS. 4 and 5, the Fox et al copending application, above, describes in detail the criteria for the placement of nozzles in arrays and the arrangement and number of arrays to attain the proper interlacing on a continuous basis along the length of the document to be printed. The proper interlace is attained with drum 22 rotating in the direction of arrow 32 and the nozzle arrays exemplified by nozzle array 21A, being driven in the direction of arrow 33. In so doing, the nozzle array printing information is derived from reversible scanner 11 which moves in the direction of arrow 34. The resultant scans are shown on the document 24 as going from left to right and the numbers encircled indicate the array and the nozzle number of the ink jet during the scanning. In accordance with the present invention, at the conclusion of the scan, scanner 11 momentarily stops while a new document 24 to be printed is loaded on drum 22 and so that a new original may be loaded on the scanner 11, if desired. The next copy is made, not by retracing the nozzle array and scanner back to the initial position and again scanning in the direction of arrows 33 and 34, but rather, the nozzle array 21A and the reversible scanner 11 scan the respective documents in the directions of arrows 35 and 36, while drum 22 continues to rotate in the direction of arrow 32. The nozzles from the array 21A continue to trace across the document 24 from left to right, but rather than angling slightly downward in the direction of arrow 33 as in FIG. 4, they angle slightly upward in the direction of arrow 35.

Figure 6:
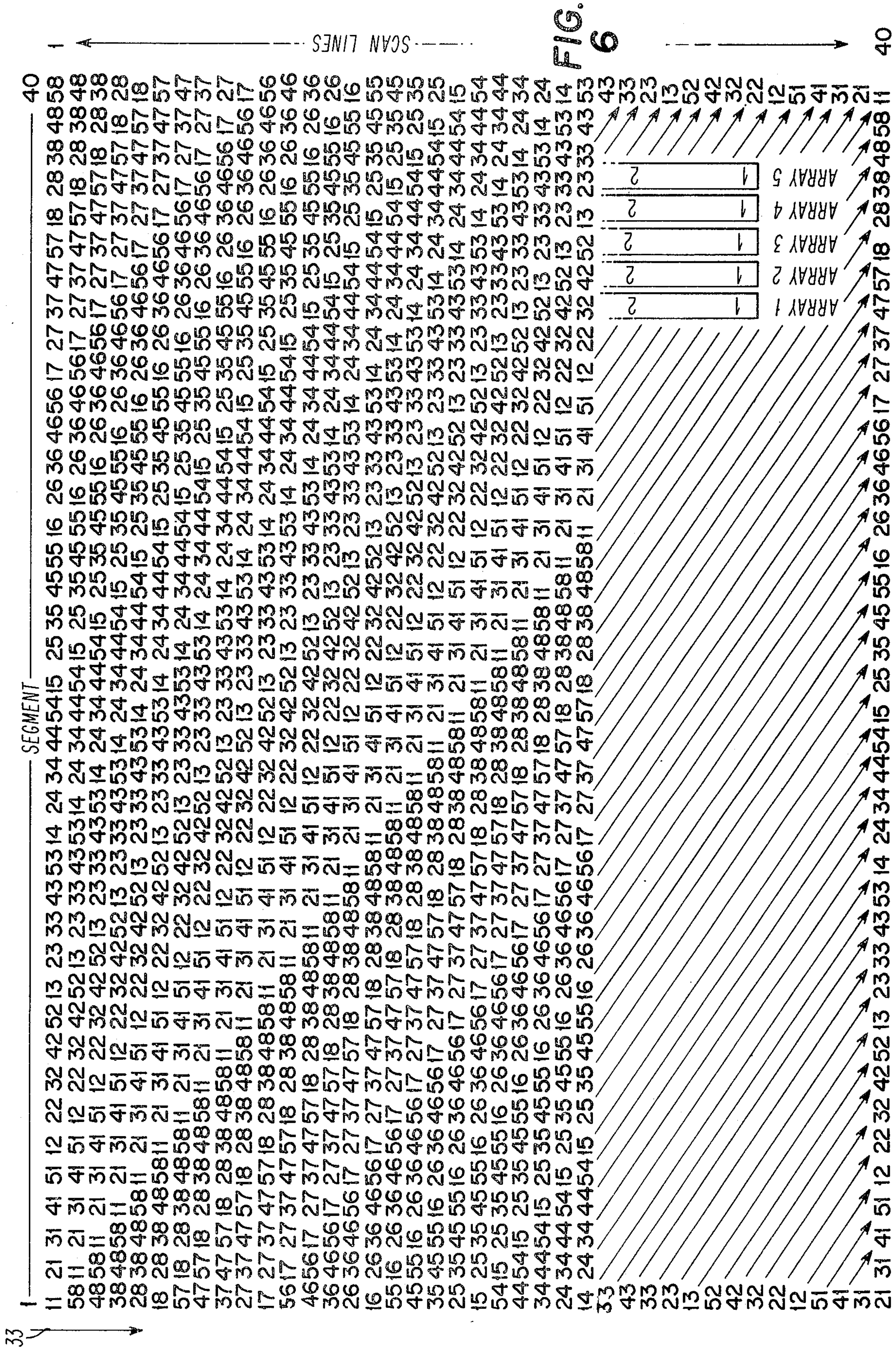
FIGS. 6 and 7 are schematic diagrams illustrating the segments and lines printed and identifies the various nozzles and arrays which print the various segments for, respectively, the opposite scan directions of FIGS. 4 and 5.

FIG. 6 illustrates forty scan lines as reproduced on the document 24 as wrapped on drum 22 when the nozzle arrays are advancing in the direction of arrow 33 in FIG. 4. Portions of the ink jet arrays are shown in overlay form over the document. Each of the forty scan lines include forty segments, as defined above. The drawing in FIG. 6 is grossly distorted in order to present the information in a manner which is clearly understood. The 40 scan lines typically occupy 257 mils on the drum on paper 24 mounted thereon. The drawing contains a series of double-digit numbers. The first digit of each of the double-digit numbers represent the array number. The second digit of the double-digit numbers represent the nozzle number within the array which produced the image in that particular segment. Each of the double-digit numbers is coextensive with one of the segments. Thus, with the drum rotating such that the segments progress as shown from one through 40, in the first scan line, the first segment is produced by the first nozzle of the first array and the resultant number is 11. The second segment of the first scan line is produced by the first nozzle of the second array so that the number is 21. The third segment is produced by the first nozle of the third array, the fourth segment by the first nozzle of the fourth array, and the fifth segment by the first nozzle of the fifth array. The second nozzle of the first array reproduces the sixth segment on the first scan line. The sequence continues as shown throughout the scan line. The eighth nozzle of the fifth array reproduces the first segment of the second scan line and all of the other nozzles are displaced in the drawing one segment to the right. Subsequent scan lines are produced in the same manner with the segments produced by the nozzles precessing to the right and moving back to the left when the fortieth segment was done on the preceeding line. The 40 lines illustrated in FIG. 6 are, as previously stated, distorted and only occupy approximately 257 mils of space in the vertical direction on the paper on which the image is being produced. The width, however, is substantially as illustrated in FIG. 6. A complete page, of course, will require many reproductions, one after the other, of the 40 lines illustrated in FIG. 6. The drum rotation thus repeatedly transports any paper past the ink jet heads and thus may be called a "repeating" direction, while axial movement of the ink jet heads may be called a "scan" direction.

Figure 7:
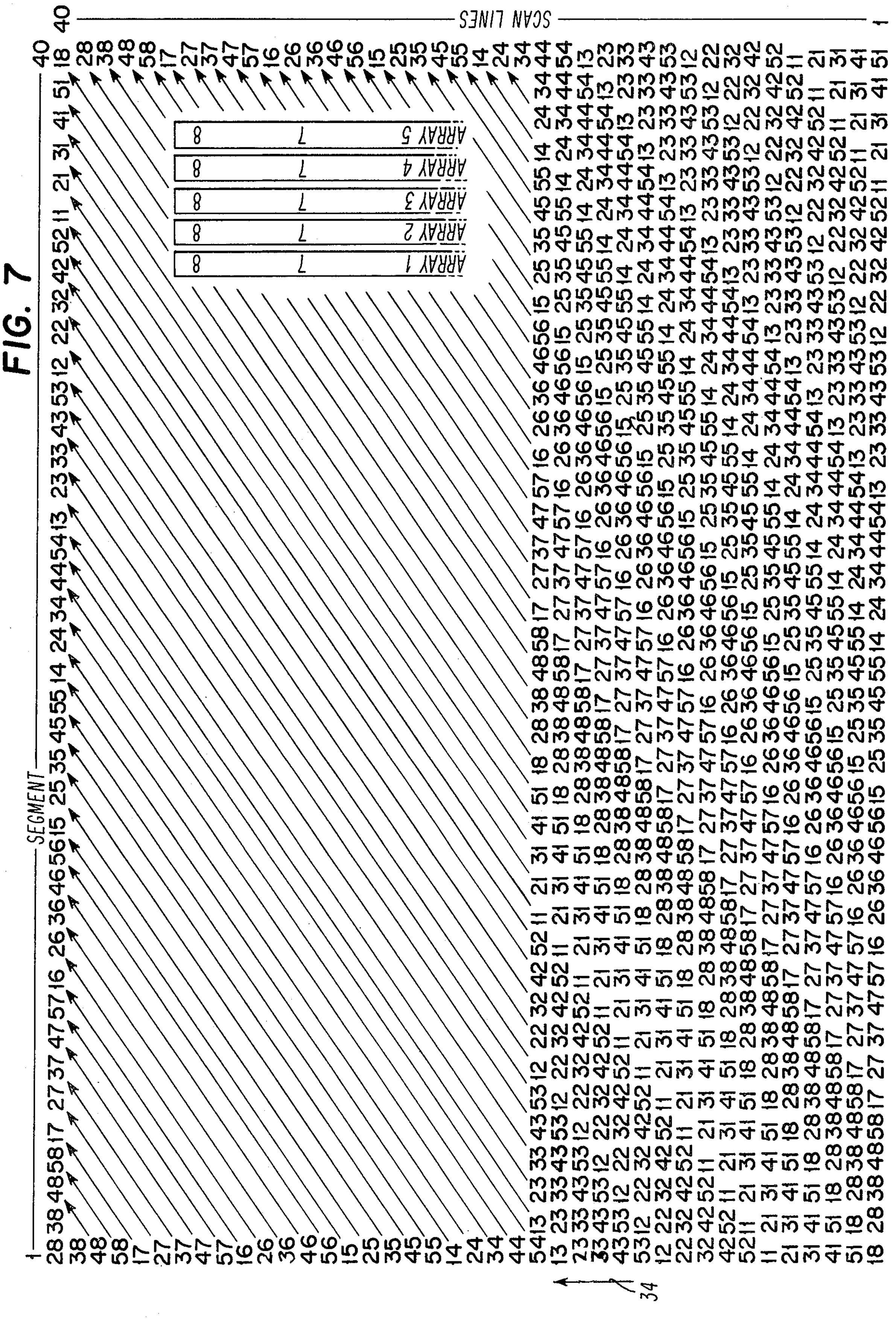

Referring to FIG. 7, 40 scan lines are illustrated as would be reproduced on the drum, similarly to FIG. 6, except that the ink jet arrays (shown in overlay) scan in the direction of arrow 34. Once again, the drawing in FIG. 7 is grossly distorted in order to present the information in the manner which is clearly understood. Actually, the 40 scan lines typically occupy 257 mils on the drum or paper mounted thereon, whereas the width comprising the 40 segments is substantially as illustrated. Once again, the first digit of each of the double-digit numbers represents the array number, and the second digit represents the nozzle number. FIG. 6 illustrates the diagonal motion of the array resulting from movement of the array in the direction of arrow 33 and the rotation of the drum from right to left, thus printing of the area illustrated is initiated with nozzle 1 of each of the arrays. In FIG. 7, the arrays are moving in the direction of arrow 35, while the drum continues to rotate from right to left. Thus, the initial printing of the area illustrated is done in the lower left-hand corner by nozzle 8 of each of the arrays. Thus, in the first scan line, the first segment is produced by the eighth nozzle of the first array and the number is 18. The second segment of the first line is produced by the eighth nozzle of the second array. The third segment is produced by the eighth nozzle of the third array, the fourth segment by the eighth nozzle of the fourth array, and the fifth segment by the eighth nozzle of the fifth array. The seventh nozzle of the first array reproduces the sixth segment on the first scan line. The sequence continues throughout the scan line. The first nozzle of the fifth array produces the first segment of the second scan line and all of the other nozzles in the arrays are displaced one segment to the right. Subsequent lines are produced in the same manner with the segments produced by the nozzles precessing to the right and moving back to the left when the fortieth segment was done on the preceeding line.

Similar charts can be constructed for the various arrangements of arrays and of nozzles as described in the aforementioned Fox et al copending application.

The clock generator 12, address generator 18, and the input signal value generator 16 of FIG. 1 are illustrated in detail and described in detail, and the source organizer 14 of FIG. 1 is illustrated herein in FIG. 8 and described in detail in the referenced copending Fox et al application. The circuitry in the operation remain unchanged between the Fox et al application and the present application, and the drawings and description thereof are therefore incorporated herein by reference.

Figure 9:
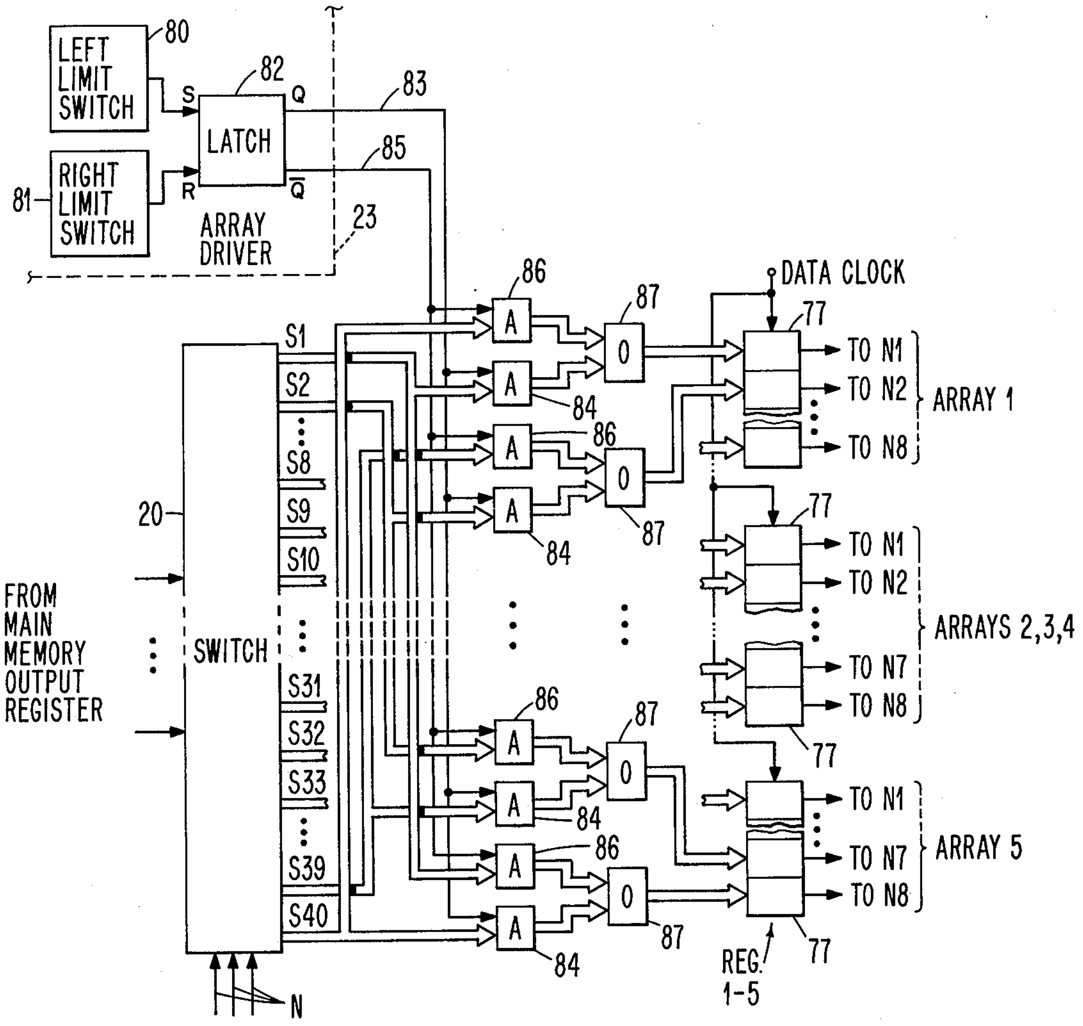
FIG. 9 is a detailed block diagram of the switch, the direction control circuitry, and the array registers of FIG. 1.

FIG. 9 illustrates in detail the switch, direction control, and array registers 20 of FIG. 1, as well as an added portion to the array drive 23 in FIG. 1. Specifically, included in array drive 23 are limit switches 80 and 81 and latch 82. Limit switch 80 is operated upon the array drive 23 in FIG. 1 driving the arrays 21 to the extreme right of drum 22, as illustrated. Limit switch 81 is operated upon the array drive 23 driving the ink jet arrays 21 to the left-most extreme of motion along drum 22. As the extremes of motion are reached, the array drive stops while the document printed is unloaded and a new document to be printed is loaded on the drum 22. As the next copy is printed, the array drive 23 drives the array in the direction opposite to that for printing the previous document. The direction of motion that the array 21 is driven by array drive 23 may be signaled by latch 82.

Latch 82 is set by a signal from limit switch 80 and is reset by a signal from limit switch 81. When set, latch 82 provides a signal on line 83 to a series of AND circuits 84. When reset, latch 82 supplies a signal on line 85 to a series of AND circuits 86. Upon latch 82 being set by top limit switch 80, all of the AND circuits 84 are operated by a signal on line 83 from latch 82 to gate the data as presented from switch 20 to OR circuits 87, which transmit the data to registers 77. Similarly, upon latch 82 being reset by bottom limit switch 81, AND circuits 86 are actuated by a signal on line 85 to transmit the data from switch 20 to OR circuits 87, which transmit the data to registers 77.

Switch 20 is connected to the output register associated with main memory 15 and receives 25 bits in parallel therefrom. The outputs from switch 20 will be provided on 40 cables S1–S40. Thus, one cable is provided for each nozzle in each array. Switch 20 also receives the "N" signal from signal value generator 16 of FIG. 1. The first eight cables, S1–S8 are connected in parallel to the first five bit positions from the output register of main memory 15 via switch 20. They are selectively connected under control of the "N" signal from signal value generator 16. The next eight cables S9–S16 associated with another array are connected to sixth through tenth bit position of the output register of memory 15 via bit 20, under control of the "N" signal from value generator 16. In a similar manner, the eight cables associated with each of further arrays are connected to the next succeeding group of five bits from the output register of main memory 15, via switch 20 under control of the "N" signal from signal value generator 16.

Data is supplied to the cable in parallel from switch 20. Each of the cables S1–S40, is connected to an AND circuit 84 and an AND circuit 86. Should a signal be present on line 83, any data appearing on the cables will be transmitted by the AND circuits 84 via OR circuits 87, to the registers 77. Each of the registers 77 is associated with an individual nozzle. The registers 77 are arranged by nozzle array and by nozzle number within the array. Thus, the data from cables S1–S8 is supplied to registers 77 for nozzles 1 through 8 of array 1. Similarly, data from cables S9–S16 is supplied to registers 77 for nozzles 1 through 8 of array 2, etc. The data from the registers 77 is then gated out serially to the respective nozzles for printing in accordance with the pattern illustrated in FIG. 6.

Should the scanner and the array drive be moving in the opposite direction, a signal is present on line 85 which causes the data on cables S1–S40 to be gated by AND circuits 86. This data is gated via OR circuits 87 to the registers 77. In this instance, however, the data appearing on cables S1–S8 are supplied to registers 77 for nozzles 8 through 1 of array 5. Similarly, the data appearing on cables S9–S16 are gated by AND circuits 86 to registers 77 for nozzles 8 through 1 of array 4. The data for the remaining cables are similarly transmitted so that, lastly, the data appearing on cables S33–S40 are transmitted by AND circuits 86 to registers 77 for nozzles 8 through 1 of array 1. The data stored in registers 77 in parallel via switch 20 and the AND circuits 84 and 86 and OR circuits 87 comprising the direction control circuitry, is thus subsequently shifted out in serial fashion under control of the data clock signal to the connected nozzles, as indicated.

Figure 10:
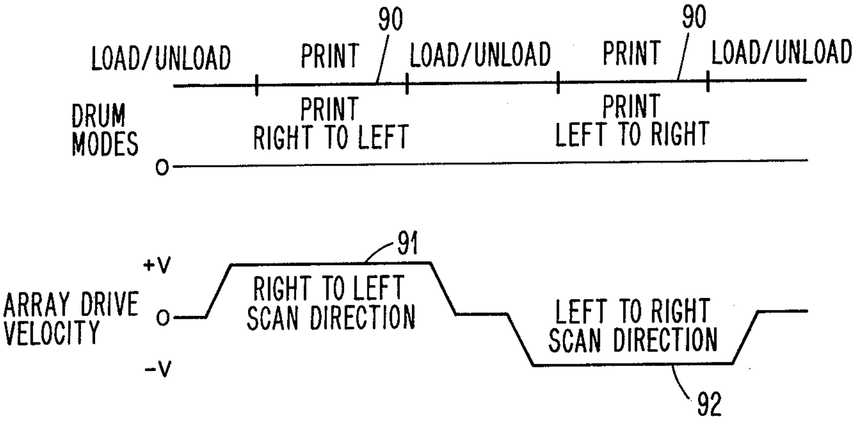
FIG. 10 is a graphical representation of the drum velocities and nozzle array drive scan velocities during operation.

Referring to FIG. 10, the drum operates in the load/unload mode for at least one revolution to unload the previously printed document, if any, and to load a document to be printed. During this period, the array drive is stopped. To ensure against starting the array drive from an intermediate position after the power is turned on for the machine, the array drive is initially driven to the right or top, to contact limit switch 80. The array drive then remains stopped at the limit until a copy is to be made.

When a copy is to be made, the drum assumes the printing mode at the printing velocity 90. At the same time, the array drive accelerates in the top to bottom or right to left scan direction to attain the velocity 91, at which time printing occurs. At the conclusion of printing, the drum assumes the unload/load mode and the array drive decelerates while moving off the document to the left or bottom, contacting limit switch 81, and stopping. After the printed document is unloaded and a new document to be printed is loaded, and a copy is to be made, the drum again assumes the printing mode 90 and the array drive accelerates in the opposite direction to velocity 92. Similarly, the reversing scanner 11 follows a velocity pattern similar to that of the array drive, reaching similar velocities 91 and 92.

The direction control circuitry of FIG. 9 is operable for any of the arrangements of arrays, of nozzles, and of data directing apparatus of the Fox et al application so long as the gating circuits 84 and 86 are arranged to supply the data in precisely opposite order through the ink jet nozzles when the array drive and reversing scanner are operated in the reverse direction.

While the invention has been particularly shown and described with reference to a preferred embodiment thereof, it will be understood by those skilled in the art that various changes in form and details may be made therein without departing from the spirit and scope of the invention.

What is claimed is:

1. In a multiple print element copying apparatus with image scanning means for scanning an original, means for simultaneously translating a receiving medium with respect to the multiple print elements in a first repeating direction and in a second scan direction substantially orthogonal to the first direction to interlace the paths traced by the print elements, and means for supplying data from the scanning means to the print elements in a predetermined order to control the printing of the print elements, the improvement comprising:

means for reversibly operating said image scanning means and said translating means in said second scan direction;

means for indicating said direction of scan of said image scanning means and said translating means; and gating means responsive to said indication for gating said print data to said print elements in said predetermined order upon said indication of a first scan direction, and for gating said print data to said print elements in a second order upon said indication of a reverse scan direction.

2. The multiple print element copying apparatus of claim 1 wherein:

said gating means gates said print data in said second order to said print elements essentially opposite to said predetermined order at said print elements.

3. The multiple print element copying apparatus of claim 2 wherein:

said indicating means supplies a first signal to indicate one scan direction of said image scanning means and said translating means, and a second signal to indicate the reverse scan direction thereof; and said gating means comprises first and second gating means, said first gating means responsive to said first signal for gating said print data to said print elements in said predetermined order, and said second gating means responsive to said second signal for gating said print data to said print elements in said second order.

4. In a multiple array printing apparatus including a reversible data source for supplying image data, means for supporting a receiving medium, multiple parallel arrays of print elements, each print element in an array disposed in a straight line and separated from one another by an essentially equal distance greater than one resolution element measured at said receiving medium, means for simultaneously translating said receiving medium with respect to said multiple print elements in a first repeating direction and in a second scan direction substantially orthogonal to the first direction and parallel to said arrays to interlace the paths traced by said print elements on said receiving medium; and means for supplying data from said scanning means to said print elements in a predetermined order to control the printing of the print elements, the improvement comprising:

means for reversibly operating said translating means along said second scan direction in conjunction with said reversible data source;

means for indicating said direction of scan of said translating means; and gating means responsive to said indication for gating said print data to said print elements in said predetermined order upon said indication of a first scan direction, and for gating said print data to said print elements in a second order upon said indication of a reverse scan direction.

5. The multiple array printing apparatus of claim 4 wherein:

said gating means gates said print data in said second order to said print elements essentially opposite to said predetermined order at said print elements.

6. The multiple array printing apparatus of claim 5 wherein:

said indicating means supplies a first signal to indicate one scan direction of said translating means, and a second signal to indicate the reverse scan direction thereof; and said gating means comprises first and second gating means, said first gating means responsive to said first signal for gating said print data to said print elements in said predetermined order, and said second gating means responsive to said second signal for gating said print data to said print elements in said second order.

7. In a multiple array ink jet printing apparatus including a reversible data source for supplying image data, means for supporting a receiving medium, multiple parallel arrays of ink jet print elements, each ink jet print element in an array disposed in a straight line and separated from one another by an essentially equal distance greater than one resolution element measured at the point of marking said receiving medium, means for simultaneously translating said receiving medium with respect to said multiple ink jet print elements in a first repeating rotary direction and in a second axial scan direction substantially and parallel to said arrays to interlace the paths traced by said ink jet print elements on said receiving medium, and means for supplying data from said scanning means to said ink jet print elements in a predetermined order to control the printing of the print elements, the improvement comprising:

means for reversibly operating said translating means along said second axial scan direction in conjunction with said reversible data source;

means for indicating said direction of scan of said translating means; and gating means responsive to said indication for gating said print data to said ink jet print elements in said predetermined order upon said indication of a first axial scan direction, and for gating said print data to said ink jet print elements in a second order upon said indication of a reverse scan direction.

8. The multiple array ink jet printing apparatus of claim 7 wherein:

said gating means gates said print data in said second order to said ink jet print elements essentially opposite to said predetermined order measured at said ink jet print elements.

9. The multiple array ink jet printing apparatus of claim 8 wherein:

said indicating means supplies a first signal to indicate one axial scan direction of said translating means, and a second signal to indicate the reverse axial scan direction thereof; and said gating means comprises first and second gating means, said first gating means responsive to said first signal for gating said print data to said ink jet print elements in said predetermined order, and said second gating means responsive to said second signal for gating said print data to said ink jet print elements in said second order.

10. A multiple array ink jet printing apparatus comprising:

a source of data for reversibly supplying image data;

means supporting a receiving medium;

multiple parallel arrays of ink jet print elements, each print element in an array disposed in a straight line and separated from one another by an essentially equal distance greater than one resolution element measured at said receiving medium;

means for rotating said supporting means about an axis parallel to said arrays for translating said receiving medium with respect to said arrays in a first repeating direction;

means for reversibly axially translating said arrays with respect to said receiving medium simultaneously with said rotating means, said axial direction being substantially orthogonal to said first repeating direction to interlace the paths traced by said ink jet print elements on said receiving medium, said means operating in conjunction with said reversible data source;

means for indicating said direction of scan of said axial translating means; and gating means responsive to said indicating for gating said print data to said ink jet print elements in said predetermined order upon said indication of a first axial scan direction, and for gating said print data to said ink jet print elements in a second order upon said indication of a reverse axial scan direction.

11. The multiple array ink jet printing apparatus of claim 10 wherein:

said gating means gates said print data in said second order to said ink jet print elements essentially opposite to said predetermined order measured at said ink jet print elements.

12. The multiple array ink jet printing apparatus of claim 11 wherein:

said indicating means supplies a first signal to indicate one scan direction of said axial translating means, and a second signal to indicate the reverse scan direction thereof; and said gating means comprises first and second gating means, said first gating means responsive to said first signal for gating said print data to said ink jet print elements in said predetermined order, and said second gating means responsive to said second signal for gating said print data to said ink jet print elements in said second order.

* * * * *